J. McDONALD.
CAR CHAIN.
APPLICATION FILED JAN. 18, 1911.
1,000,930.
Patented Aug. 15, 1911.
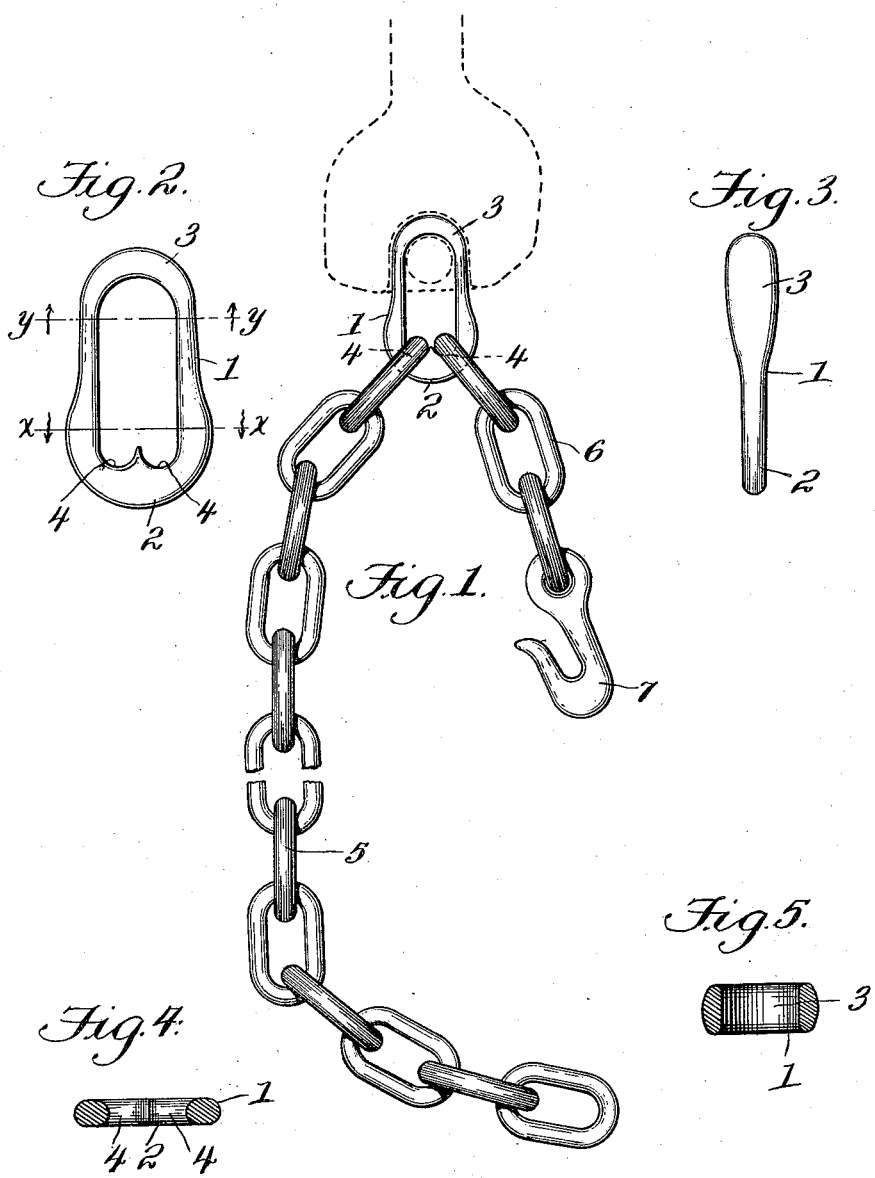
Inventor
John McDonald,
Witnesses
J. T. L. Wright.
V. B. Hillyard.
By Victor J. Evans,
Attorney.

UNITED STATES PATENT OFFICE.

JOHN McDONALD, OF STAPLES, MINNESOTA.

CAR-CHAIN.

1,000,930.  Specification of Letters Patent. Patented Aug. 15, 1911.

Application filed January 18, 1911. Serial No. 603,305.

*To all whom it may concern:*

Be it known that I, JOHN McDONALD, a citizen of the United States, residing at Staples, in the county of Todd and State of Minnesota, have invented new and useful Improvements in Car-Chains, of which the following is a specification.

The present invention provides a chain of novel formation for connecting two cars when the drawhead of one has become disabled or unfit for further immediate safe usage, the chain being of such structure as to admit of slack being readily taken up and also to insure strength of connection and reliability in service.

The invention contemplates a coupling chain embodying a link of peculiar formation, said link having an end portion peculiarly formed to enter the sound drawhead and receive the coupling pin and the other end of the link being of such formation as to admit of the links comprising the chain forming in effect two chains of different lengths, the one provided with a coupling hook and the other adapted to engage the disabled car so as to form the connection, one of the links of the longer chain being adapted to be engaged by the coupling hook after the slack has been taken up.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a top plan view of a car chain embodying the invention, the dotted lines showing a drawhead and coupling pin. Fig. 2 is a top plan view of the coupling link on a larger scale. Fig. 3 is a side view thereof. Fig. 4 is a cross section of the link on the line $x$—$x$ of Fig. 2. Fig. 5 is a cross section of the link on the line $y$—$y$ of Fig. 2.

Corresponding and like parts are referred to in the following description, and indicated in all the views of the drawing, by the same reference characters.

The coupling link is indicated at 1 and is of a length and width best adapted for the purpose depending upon the nature of the drawbar and the style of the links forming the chain proper. The end portion 2 of the link is designated for convenience as the outer end, whereas the end portion 3 is referred to as the inner end because engaging the drawhead and receiving the coupling pin. The side bars of the inner end 3 of the link are flattened in a direction at a right angle to the plane of the link so as not to materially weaken the link and yet admit of the inner portion of the link occupying the space between the coupling pin and the walls of the link receiving recess of the drawhead. The outer end bar of the link is somewhat flattened and its inner side is formed with two depressions 4 constituting the seats to receive the links of the chain fitted to the coupling link 1.

The chain may be referred to as comprising two members 5 and 6 each formed of links of like structure. The member 6 constitutes a short chain which has a coupling hook 7 at its outer end. The member 5 constitutes the long chain and is adapted to engage a convenient part of the running gear of the disabled car so as to connect the same to the sound car. After the long chain 5 has been suitably engaged with the disabled car it is drawn taut to take up any slack, after which one of its links is engaged by the coupling hook 7, thereby completing the connection.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A car chain having a link near one of its ends adapted to receive the coupling pin of a draw-head, said link having the inner end portions of its side bars widened in planes at a right angle to the plane of the link, and having its outer end bar widened in the plane of the link and formed upon its inner side with recesses providing seats to receive the adjacent links of the chain coupled thereto.

In testimony whereof I affix my signature in presence of two witnesses.

JOHN McDONALD.

Witnesses:
J. R. NORRIS,
GEO. P. RICE.

Copies of this patent may be obtained for five cents each, by addressing the "Commissioner of Patents, Washington, D. C."